March 25, 1958 W. WAGNER 2,827,913
SELF-TAPPING VALVE FOR TUBES, PIPES, TANKS AND
OTHER CONDUITS AND CONTAINERS
Filed July 28, 1955

INVENTOR
WILLIAM WAGNER.
BY
ATTORNEY

2,827,913
Patented Mar. 25, 1958

United States Patent Office

2,827,913

SELF-TAPPING VALVE FOR TUBES, PIPES, TANKS AND OTHER CONDUITS AND CONTAINERS

William Wagner, Rockaway, N. J.

Application July 28, 1955, Serial No. 524,891

2 Claims. (Cl. 137—318)

This invention relates to a self-tapping valve for tubes, pipes, tanks and other conduits and containers.

By way of illustration, refrigeration lines sometimes require tapping either for discharge or re-charge purposes or the like. This may be done by securing a self-tapping valve to the line. This valve is provided with a piercing needle which pierces the wall of the refrigeration line. Once a hole is pierced in said wall, the needle functions as a valve member relative to said hole. The entire device becomes a permanent part of the line and it includes the valve housing and a screw-type spindle in said housing and a handle to actuate said spindle.

Charging or discharging a refrigeration line by the tapping method is something that takes place at infrequent intervals. To encumber a line with this entire mechanism at all times for the single time it is used or for the few times it is used produces great disadvantages. For one thing, a relatively expensive mechanism capable of repeated use is immobilized on a line that may never again require its use. Furthermore, the line is encumbered by a relatively large device which does not enhance the line's appearance. Moreover, said device extends radially away from the line for a considerable distance and an offset or unbalanced weight is thereby mounted on the line in such manner as would tend to loosen the device on the line, particularly in the presence of vibratory forces which may be set up in or around the line. When this device becomes loose, leaks develop.

It is a principal object of this invention to provide a line tapping device of the character described, which consists of two separable units: The first is the valve unit proper and the second is a tool for actuating the same.

The valve unit comprises a relatively small housing which clamps onto a refrigeration line or the like and it includes the tapping needle which taps the line and thereafter functions as a needle valve. The tool unit may be removably secured to the valve unit and it includes a tool which is engageable with the needle, a screw-threaded spindle connected to said tool and an actuating handle connected to said spindle. Said tool unit also includes a housing which branches off into a screw-threaded tubular portion through which the line may be charged or discharged.

After a line is tapped, the valve unit may be left on the line so as to seal off the pierced hole and also to provide permanently installed means for future discharging or re-charging of the line. The valve unit is a relatively small device which does not encumber the line with a heavy, off-center weight. It is not unsightly and in view of its small size does not form or constitute a dangerous or annoying projection on said line.

The tool unit may be removed from the valve unit upon completion of a given charging or discharging operation. This will not interfere in any way whatsoever with the sealing of the tapped hole by the needle of the valve unit. The tool unit is then free to be applied to other valve units of like construction.

An important object of this invention is the provision of a line tapping device of the character described in which a double seal is provided by means of washers, in addition to the sealing action of the valve needle itself. The needle is provided with an annular shoulder adjacent its pointed end. An annular washer abuts said annular shoulder and when the needle is screwed to its sealing position, said shoulder presses said washer against the line, encircling the pierced hole, and thereby provides a tight seal between said needle and said line, this being in addition to the sealing action of the needle itself in said hole.

The valve needle is also provided with a head which is slotted or otherwise formed to receive a tool. Between the head of said needle and that portion of the valve housing through which the needle extends, is a second washer. When the needle is screwed to sealing position relative to the tapped hole, its head will press the second washer against the housing and a tight seal will thereby be provided. Still another seal is provided between a screw cap on said housing and the housing itself. A third washer is positioned between said cap and said housing to provide this additional seal.

An important object of this invention is the provision of a soft metal disc on the first washer, namely, the washer between the annular shoulder of the needle and the line or container being tapped. This disc may be made of soft copper, brass, aluminum or the like. It will be understood that the first washer is frictionally engaged by the point of the piercing needle in addition to its engagement with the shoulder of the needle. The needle is a screw-threaded member which may be turned in one direction to tap and seal a hole and in the opposite direction to open said hole. This turning movement involves frictional engagement with the washer which is normally made of natural or synthetic rubber. Such frictional engagement tends to abrade the washer and fine particles of rubber find their way between the point of the needle and the edge of the tapped hole in the line or container. These particles would tend to prevent the formation of a tight seal. When a soft metal disc is placed upon the washer, the point of the needle first pierces said disc and bends it into cone formation into the rubber washer itself, so that the frictional engagement which would otherwise take place between the point of the needle and the rubber washer now takes place between the point of the needle and the deformed portion of the soft metal disc. The cone formation tends to maintain the shape of the washer and to prevent deformation of its central hole portion and it also tends to prevent the formation of abraded rubber particles therein.

The invention is illustrated in the accompanying drawing in which.

Figure 1:
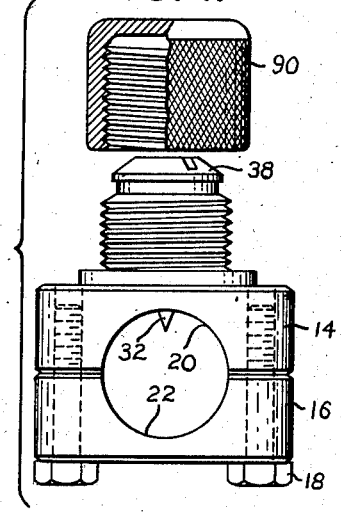
Fig. 1 is an exploded side view of a line-tapping device made in accordance with this invention, showing a cap for said device which may be applied thereto to provide additional sealing action.
Figure 2:
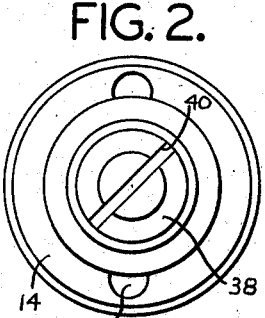
Fig. 2 is a top view of said line-tapping device with its cap removed therefrom.

Refering now to the first three figures of the drawing, it will be seen that a self-tapping valve 10 is applied to a tube or line 12 through which a refrigerant or other fluid passes. This self-tapping valve includes an upper housing member 14 and a lower housing member 16 which are clamped together and to line 12 by means of screws 18. Each of these housing members is provided with a semi-cylindrical recess, the one in the upper housing member being designated 20 and the one in the lower housing member being designated 22, and these two recesses are adapted to register with each other to form a cylindrical opening capable of receiving line 12 as Fig. 3 clearly shows. Projecting upwardly from the upper housing member 14 is a tubular portion 24 having both internal and external screw threads.

Figure 3:
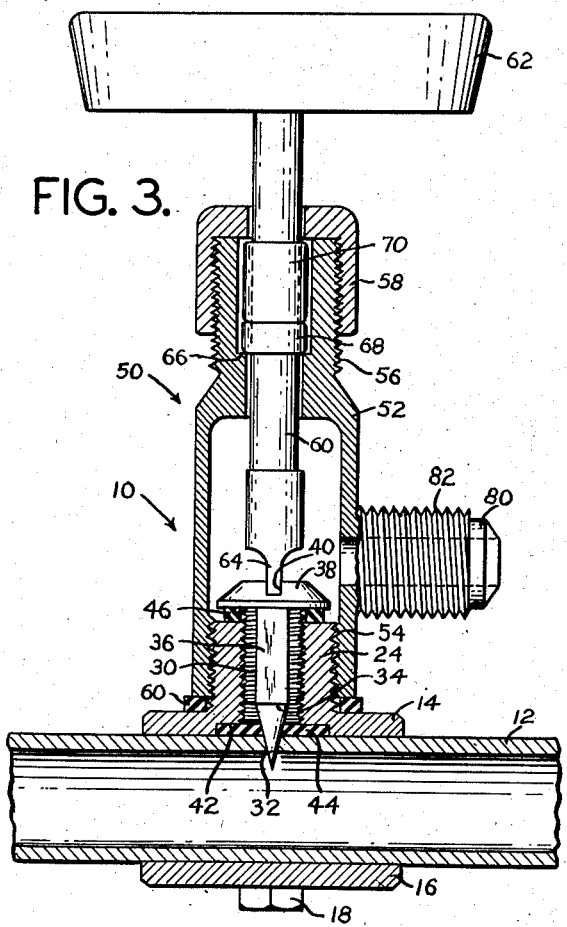
Fig. 3 is a sectional view showing said line-tapping device installed on a tubular member and showing a tool in engagement with said device to operate the same.
Figure 5:
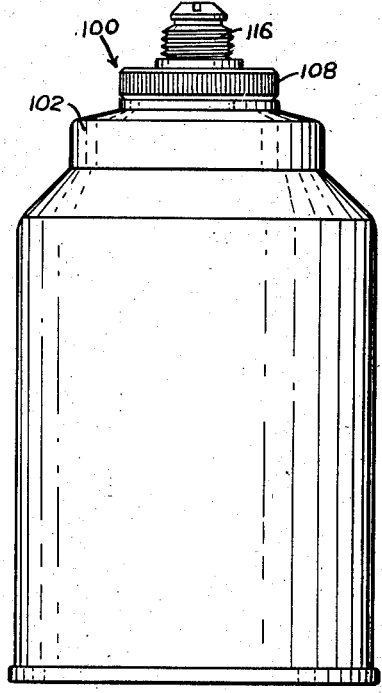
Fig. 5 is a side view of a container for a refrigerant maintained under pressure, showing the tapping device of Fig. 4 installed thereon.

A screw-threaded valve needle 30 is screwed into the tubular portion 24 as Fig. 3 shows. This screw-threaded needle has a conical or tapered point 32 which constitutes the tapping element proper. The diameter of the main body of said screw-threaded needle exceeds the diameter of said conical point and an annular shoulder 34 is thereby formed between said main body of the needle and its said conical point. A flat side 36 is provided on said screw-threaded needle longitudinally thereof and it will be understood that a passageway is thereby formed between said needle and the inner wall of tubular portion 24 through which the fluid may pass. At the top end of the screw-threaded needle is a head 38 which is provided with a slot 40 to receive an actuating tool.

An annular recess 42 is formed in upper housing member 14 in concentric relation to its tubular portion 24. A rubber or similar washer 44 is disposed within said annular recess. Another rubber washer 46 or the like encircles the screw-threaded needle 30 immediately below its head 38 and it will be observed that said washer is disposed between said head and the upper end of tubular portion 24.

After the two housing members 14 and 16 are clamped to line 12 by means of screws 18, as above explained, a suitable tool may be inserted into groove 40 of the screw-threaded needle in order to screw the needle into tapping engagement with line 12. The conical point 32 pierces the wall of line 12 while shoulder 34 presses washer 44 against said line. A double seal is thereby provided wherein the conical point 32 seals the tapped hole while the washer 44 provides a seal around said tapped hole. Similarly, head 38 of the screw-threaded needle presses washer 46 against the tubular portion 24 of the upper housing member and still another sealing action takes place. When it is desired to open the tapped hole, either for the purpose of allowing some of the fluid in the line to escape or to admit other fluid into the line, all that need be done is to turn the screw-threaded needle in the opposite direction and all three seals last above enumerated will open.

The part that has thus far been described in detail is the valve part of the device and this includes the tapping element which is simply the valve needle used for a tapping purpose. What remains to be described is the tool component 50. This tool component includes a housing 52 which is tubular and is provided with internal screw threads 54 at its lower end and external screw threads 56 at its upper end. Its lower end may be screwed to the external screw threads of tubular portion 24 of the housing of the valve component. A cap 58 is screwed to the external screw threads at the top of said housing 52. To insure a tight seal between housing 52 and housing member 14, a washer 60 is placed between the lower end of said housing 52 and housing member 14. Consequently, when housing 52 is screwed tight to tubular portion 24, its lower end presses the washer 60 against the housing member 14 and provides a leak-proof seal.

A spindle 60 extends longitudinally through housing 52 and through a hole in cap 58. At the upper end of said spindle is a knob or handle 62. At the lower end is a tool or bit 64 which is adapted to engage slot 40 of the head of the screw threaded needle 30. It will be observed in Fig. 3 that housing 52 is provided with an internal annular shoulder 66. A cylindrical washer 68 is mounted on spindle 60 for engagement with said shoulder 66. A cylindrical spacer 70 is also mounted on said spindle 60 and it will be seen that cap 58 is adapted to engage said cylindrical spacer 70 and to press it against said cylindrical washer 68, thereby pressing said washer against shoulder 66 and providing a leak-proof seal. Spindle 60 remains free to turn in order to actuate the screw threaded valve needle and it also remains free to move longitudinally in order to engage and disengage the slotted head of said needle.

A tubular side piece 80 is provided on housing 52. This side piece communicates with the inside of said chamber and it is provided with external screw threads 82 to receive a suitable internally threaded fitting. This fitting may be connected in conventional manner to a tank containing a refrigerant under pressure. When the spindle 60 is turned to open the needle valve above described, the refrigerant will be enabled to flow into the line 12 through said tubular portion 80 and housing 52 and thence through the space provided by the flat side 36 on the valve needle.

When a particular charging or discharging operation is concluded, the entire tool component 50 may be removed from the tubular portion 24 of the valve component and in its place a cap 90 may be installed. This is simply an internally threaded screw cap which is adapted for engagement with the externally threaded tubular portion 24 and it will be observed that when this takes place, said cap 90 engages washer 60 and presses it against the housing member 14, thereby providing a tight seal over and above the sealing action of the valve component itself.

Figure 4:
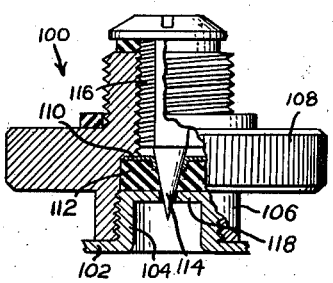
Fig. 4 is a sectional view through another tapping device made in accordance with this invention, said device being intended for tapping a container or tank, as distinguished from a conduit.

Fig. 4 shows a modified form of tapping valve 100 which is adapted for use in connection with a container 102 or the like containing a refrigerant or other fluid under pressure. This is a conventional container and it is provided with an externally threaded nozzle 104. Essentially, tapping valve 100 has the same structure as the tapping valve shown in Fig. 3 but instead of being provided with clamping means adapted to clamp it to a line, it is provided with a tubular, internally threaded collar 106 which is adapted to engage the externally threaded nozzle 104 of the container. An annular flange 108, having a knurled edge, is provided to enable a person using this device to turn it manually in either direction so as to screw it to nozzle 104 or to unscrew it therefrom.

In one respect, a variation in the internal structure is provided and this variation may equally as well be incorporated into the valve structure shown in Fig. 3. It will be observed that a metal disc 110 is disposed upon rubber washer 112 in the structure shown in Fig. 4. It is necessary for the pointed tip 114 of needle 116 to pierce metal disc 110 in order to pierce the rubber washer and then the top wall 118 of nozzle 104. The result of this piercing operation is to cause the central portion of metal disc 110 to assume a generally conical form. This conical portion extends into the rubber washer and serves as a bushing to prevent the point of the needle from abrading the rubber washer and thereby forming small particles which would interfere with sealing the opening.

The foregoing is illustrative of preferred forms of this invention and it will be understood that these preferred forms may be modified and other forms may be provided within the broad spirit of the invention and the broad scope of the claims.

I claim:

1. A valve organization consisting of a self-tapping and self-sealing valve mounted on a tubular line, comprising a valve housing, clamping means removably clamping said valve housing to said line, a screw-threaded opening formed in said valve housing, a screw-threaded valve needle engaged in said screw-threaded opening, said valve needle having a conical point adapted to punch and pierce said line and thereby to form a conical hole therein, said conical point being adapted to seal said conical hole while forming it, a passage formed between said valve needle and the wall of said screw-threaded opening, a tool engaging head provided on said valve needle, a tool housing removably secured to the valve housing, a tool rotatably supported by said tool housing, the operative end of said tool being disposed within said tool housing and in engagement with the tool engaging head of the valve needle, the opposite end of said tool being disposed outside of said tool housing and being provided with a handle for operating said tool, and a passageway opening into said tool housing and communicating with the first mentioned passage, whereby the tool may be manually operated to turn the valve needle in one direction, to advance it in the direction of said line, to pierce and seal it, and to turn said valve needle in the opposite direction to open such pierced hole for communication with said passage and said passageway, said valve housing having an annular shoulder below the head of the valve needle and a sealing washer being provided between said shoulder and said head of such dimension as to provide a tight seal therebetween and also to limit the depth of penetration of the conical point into the line to the conical portion of the valve needle.

2. A valve organization consisting of a self-tapping and self-sealing valve mounted on a tubular line, comprising a valve housing, clamping means removably clamping said valve housing to said line, a screw-threaded opening formed in said valve housing, a screw-threaded valve needle engaged in said screw-threaded opening, said valve needle having a conical point adapted ot punch and pierce said line and thereby to form a conical hole therein, said conical point being adapted to seal said conical hole while forming it, a passage formed between said valve needle and the wall of said screw-threaded opening, a tool engaging head provided on said valve needle, a tool housing removably secured to the valve housing, a tool rotatably supported by said tool housing, the operative end of said tool being disposed within said tool housing and in engagement with the tool engaging head of the valve needle, the opposite end of said tool being disposed outside of said tool housing and being provided with a handle for operating said tool, and a passageway opening into said tool housing and communicating with the first mentioned passage, whereby the tool may be manually operated to turn the valve needle in one direction, to advance it in the direction of said line, to pierce and seal it, and to turn said valve needle in the opposite direction to open such pierced hole for communication with said passage and said passageway, a sealing washer being provided between the valve housing and the tool housing to provide a leak-proof seal between the two housings, a second sealing washer being provided between the valve housing and the head of the valve needle to provide a leak-proof seal between said valve housing and said needle head, and a third sealing washer being provided on the valve housing for engagement with said line and providing a leak-proof seal between said valve housing and said line, said second sealing washer between the valve needle head and the valve housing being of such dimension as to limit the depth of penetration of the valve needle into the line to the conical portion of said valve needle.

References Cited in the file of this patent
UNITED STATES PATENTS

| | | |
|---|---|---|
| 577,462 | Stewart | Feb. 23, 1897 |
| 1,347,951 | Hohmann | July 27, 1920 |
| 1,898,935 | Brandriff | Feb. 21, 1933 |
| 1,938,984 | Smith | Dec. 12, 1933 |
| 2,114,583 | Adams | Apr. 19, 1938 |
| 2,237,476 | Cline | Apr. 8, 1941 |
| 2,391,583 | Martin | Dec. 25, 1945 |
| 2,608,989 | McDonald | Sept. 2, 1952 |
| 2,660,192 | Hunter | Nov. 24, 1953 |